United States Patent [19]

Welsch et al.

[11] Patent Number: 5,203,619

[45] Date of Patent: Apr. 20, 1993

[54] STORAGE SYSTEM INCLUDING A VERTICALLY RETRACTABLE STORAGE UNIT

[75] Inventors: John H. Welsch, Moscow; Thomas E. Meacham, Mountaintop, both of Pa.

[73] Assignee: InterMetro Industries Corporation, Wilkes-Barre, Pa.

[21] Appl. No.: 610,115

[22] Filed: Nov. 7, 1990

[51] Int. Cl.⁵ ............................................. A47B 67/02
[52] U.S. Cl. ................................... 312/247; 312/312; 312/242
[58] Field of Search ................ 312/312, 247, 242; 49/352; 248/328, 332; 74/89.2

[56] References Cited

U.S. PATENT DOCUMENTS

| | | | |
|---|---|---|---|
| 2,399,940 | 5/1946 | Piron | 49/352 |
| 2,499,791 | 3/1950 | Spencer | 312/247 |
| 3,732,742 | 5/1973 | Castaldi | 74/89.2 |

FOREIGN PATENT DOCUMENTS 2645232 4/1977 Fed. Rep. of Germany ...... 312/247

*Primary Examiner*—Joseph Falk
*Assistant Examiner*—Gerald A. Anderson
*Attorney, Agent, or Firm*—Fitzpatrick, Cella, Harper & Scinto

[57] ABSTRACT

A vertical retractable storage system includes a frame, a storage unit, and a vertical lift mechanism retractably supporting the storage unit relative to the frame. The vertical lift mechanism includes a lift structure that operates on a horizontal plane to provide both vertical and horizontal stability to the storage unit during movement between a storage position and an access position. In one aspect of the present invention, the frame is fixed to a roof or super-structure above a suspended ceiling such that in a retracted position the storage unit is disposed above the ceiling, and a base or bottom portion of the storage unit conforms with the ceiling and thereby hides the unit. In another aspect of the present invention, the vertical lift mechanism retractably supports the storage unit such that in the retracted position an access portion of the unit remains extended below the ceiling to permit access to at least a portion of the unit. In yet another aspect of the present invention, the vertical lift mechanism retractably supports the storage unit such that in the retracted position a dispensing portion of the unit remains extended below the ceiling to allow dispensing of products or materials within the unit.

10 Claims, 3 Drawing Sheets

STORAGE SYSTEM INCLUDING A VERTICALLY RETRACTABLE STORAGE UNIT

BACKGROUND OF THE INVENTION

1. Field of the Invention

The present invention relates generally to a storage system and more particularly to a storage system that includes a unit which is vertically retractable to a position at least partly above a false or suspended ceiling. The invention finds particular utility in the fast food industry where floor and wall space is limited, but where ready access to various stored supplies and foodstuffs is nevertheless highly desirable. Of course, this storage system can be used with equal advantage in many other environments.

Furthermore, the present invention relates to a novel mechanism for guiding and lifting a storage unit while shelves in it are confined in a horizontally stable attitude so that stored articles are unlikely to topple from the unit.

2. Description of the Prior Art

Ceiling storage units are known. For example, U.S. Pat. No. 4,060,292 (Medina) relates to a ceiling-mounted storage box that is reciprocable on vertical guide rails mounted on opposite walls of an enclosed area, such as the walls of a hall or corridor However, this system has a drawback in that it does not retract above the ceiling and undesirably incorporates guide rails that extend below the ceiling.

U.S. Pat. No. 4,412,601 (Cooper) relates to an above-ceiling elevator storage system wherein an elevator storage unit, supporting or containing articles to be stored, is normally disposed in an above-ceiling enclosure defined by a ceiling opening and over-lying enclosure structure. The elevator unit is lowered and raised by means of a hoist mechanism powered by an electric motor under control of a keyed switch. The elevator unit includes an upper support member from which the base platform is suspended by cables, and corner guides associated with the base platform to provide smooth seating within the ceiling opening. Although satisfactory for certain applications, this elevator system has a drawback in that it does not rigidly support the elevator unit in the horizontal plane when the unit is raised and lowered by the hoist mechanism. This lack of rigidity can cause articles stored in the elevator unit to shift or topple over, which can damage the articles and may be dangerous to persons operating the system.

U.S. Pat. No. 4,733,925 (Duran, et al.) also relates an above-ceiling storage system. More specifically, the inventors describe a suspended arrangement of juxtaposed individual tilting compartments mounted in side-by-side relation. Each tilting compartment includes an individual shelf compartment placed on a flat, rectangular or square panel. The panel is rotatable around a shaft parallel to one of its longitudinal sides, and the tilting compartment is provided with a mechanism both for locking the panels in a horizontal position and for limiting their opening in the downward direction essentially to the vertical position. Again, although this system is satisfactory for certain applications, it has a drawback in that it is rotated 90° between its exposed and retracted storage positions. Thus, articles are rotated through 90° when the system is moved between storage and loading and display access positions when the storage unit is accessed Accordingly, this tilting-type system is unacceptable for, for example, open containers of liquids. Moreover, rotation between the storage and access positions may cause the articles to shift or topple over. Thus, use of the system may damage articles stored therein and again may be dangerous to persons operating it.

SUMMARY OF THE INVENTION

In order to overcome the drawbacks of prior ceiling storage structures, it is an object of the present invention to provide a storage system, having a vertically retractable storage unit, comprising a support structure and a vertical lift mechanism disposed substantially above a dropped or false ceiling plane.

It is another object of the present invention to provide such a storage system having a vertical lift mechanism disposed substantially above the plane of the ceiling for stably supporting a storage unit during movement between the retracted storage position above the ceiling plane and an extended or lowered access position below the ceiling plane.

It is another object of the present invention to provide such a storage system having a vertical guide disposed substantially above the ceiling plane for stably supporting and guiding the storage unit between a storage position above the ceiling and an access position below the ceiling.

It is yet another object of the present invention to provide such a storage system that retracts a storage unit to a storage position above the ceiling plane thereby concealing or hiding the unit.

It is still another object of the present invention to provide such a storage system that retracts a storage unit to a position at least partly above a ceiling thereby hiding an upper storage portion of the unit while providing access to a lower access portion of the unit.

It is another object of the present invention to provide such a storage system that may be mounted in existing suspended ceiling environments.

It is a further object of the present invention to provide a storage system that includes a mechanism for guiding and lifting a storage unit while confining shelves in it in a horizontally stable attitude.

These and other objects of the present invention are achieved by provision of a storage system having a frame, a storage unit, and a vertical lift mechanism retractably supporting the storage unit relative to the frame. The vertical lift mechanism includes lift means operating on a horizontal plane to provide both vertical and horizontal stability to the storage unit during movement between a storage position and an access position of the unit. The frame may be fixed to a roof or superstructure above a suspended ceiling such that in a retracted position the storage unit is disposed above the ceiling. A base or bottom portion of the storage unit may conform to the ceiling to thereby hide or conceal the unit. The vertical lift mechanism may retractably support the storage unit such that, in the retracted position, an access portion of the storage unit remains extended below the ceiling to permit access to at least a portion of the unit. The vertical lift mechanism may also retractably support the storage unit such that in the retracted position a dispensing portion of the unit remains extended below the ceiling to allow dispensing of products or materials within the unit.

The vertical lifting mechanism includes a plurality of pulleys and a continuous cable reeved thereabout. The pulleys guide the reeved continuous cable in an inverted U-shape configuration above the storage unit. Lifting pins are coupled to the storage unit and are affixed to the continuous cable on opposite legs of the inverted U-shape. Reciprocal travel of the continuous cable about the pulleys causes the lifting pins reciprocally to move in unison in the vertical direction.

The present invention and these and many other attendant features and advantages thereof will be readily and more completely appreciated with reference to the following detailed description of a preferred embodiment taken together with the accompanying drawing.

DETAILED DESCRIPTION OF A PREFERRED EMBODIMENT

Figure 1:
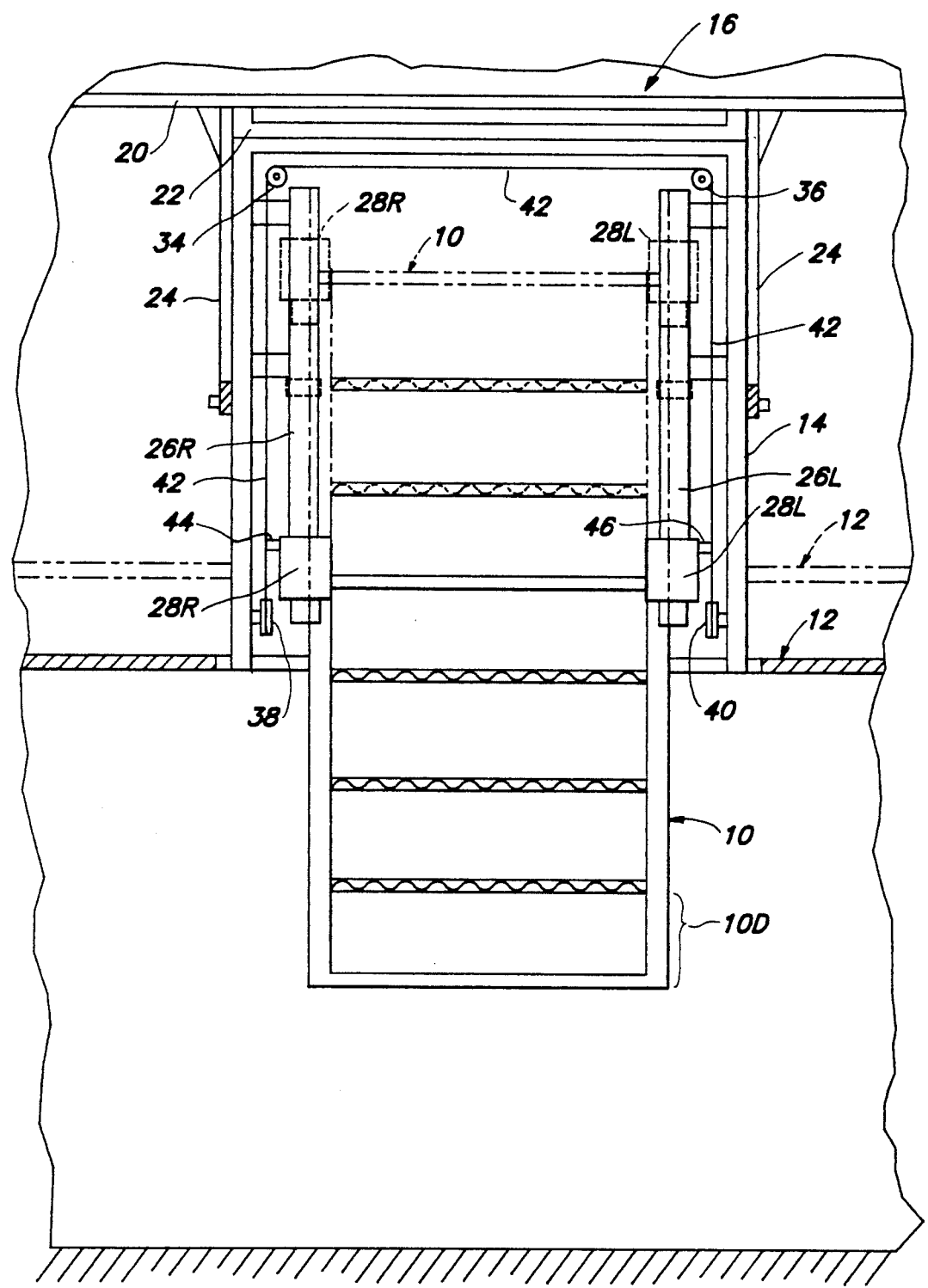
FIG. 1 is a front elevational view of a storage system including a vertically retractable storage unit in accordance with a preferred embodiment of the present invention.
Figure 2:
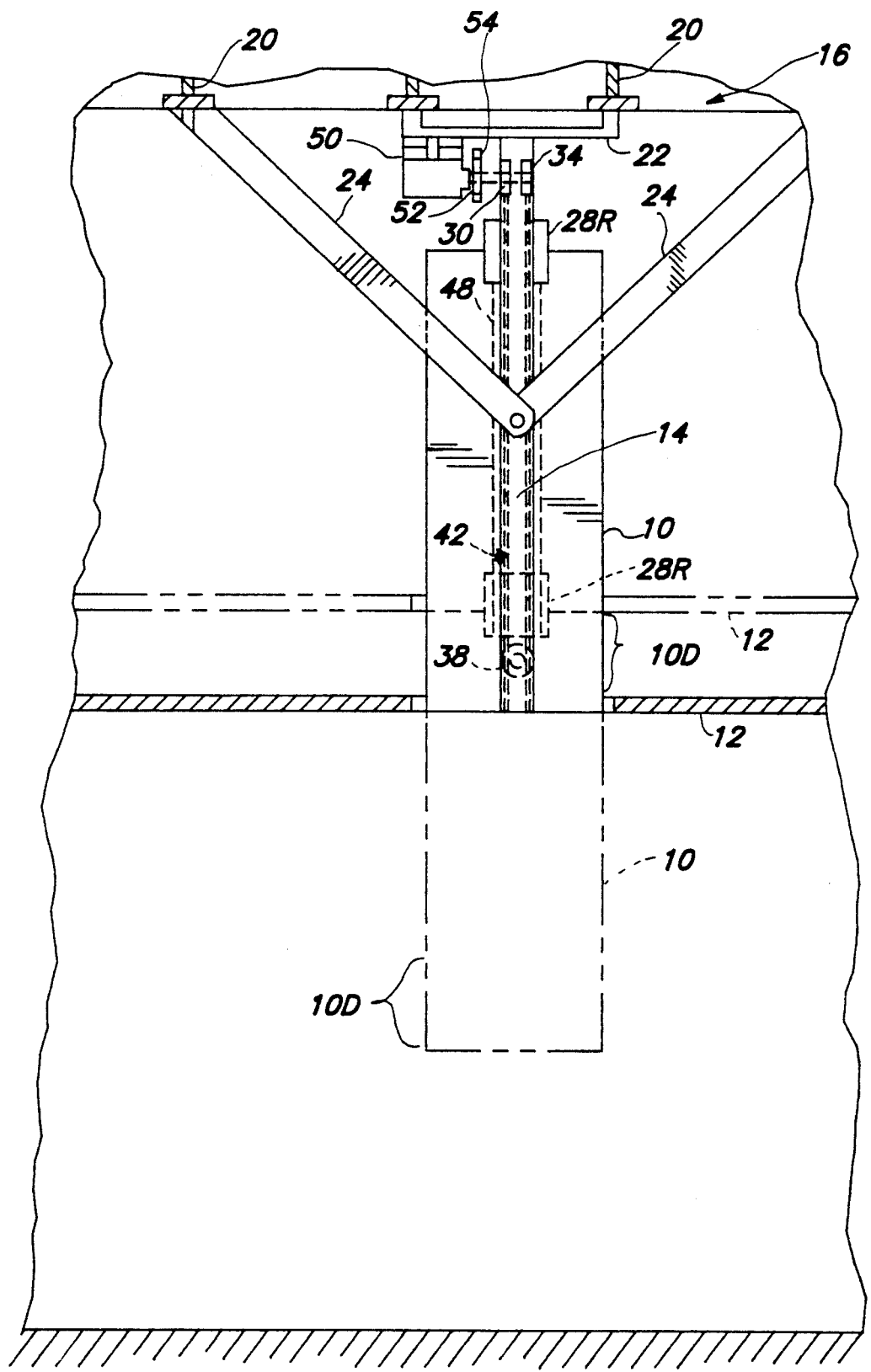
FIG. 2 is a side view of the storage system shown in FIG. 1, suspended from a roof structure.
Figure 3:
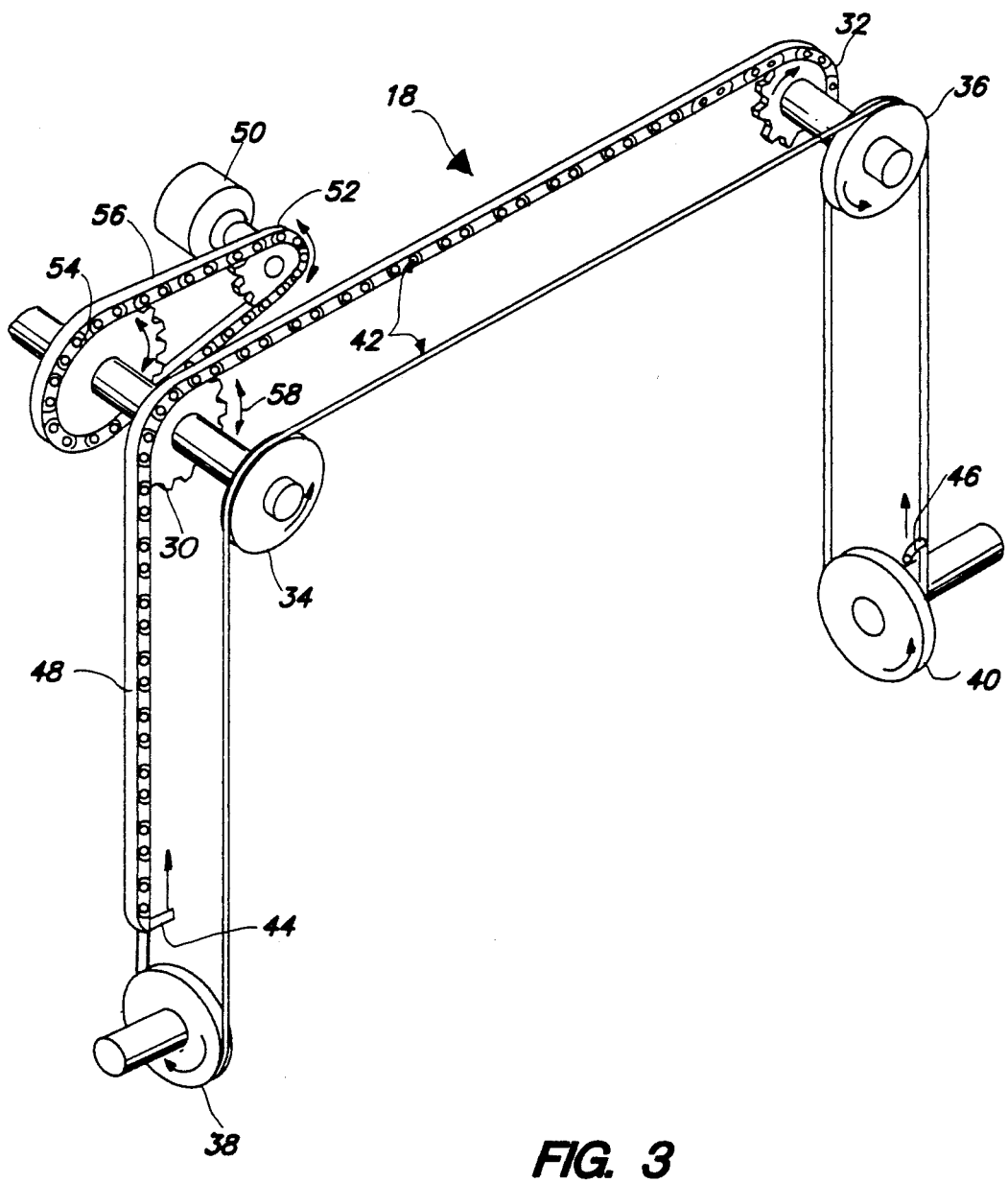
FIG. 3 a diagrammatic perspective view of a vertical lifting mechanism for the storage system shown in FIGS. 1 and 2.

Referring now to the drawing wherein like reference numerals designate identical or corresponding parts throughout the several figures, FIGS. 1 to 3 illustrate a preferred embodiment of the storage system of the present invention, which includes a vertically retractable storage unit. More particularly, as shown therein, in the preferred embodiment the system includes a storage unit 10 retractable vertically between a position substantially above a false or suspended ceiling 12 and a position substantially below the ceiling 12. The storage unit 10 is supported for vertical retraction by an inverted U-shaped frame 14 fixed to the roof 16 above the suspended ceiling 12 as shown in detail in FIG. 2. Vertical retraction is effected by a vertical lifting mechanism 18 mounted between the frame 14 and the storage unit 10. As discussed in detail below, the storage system can be mounted at various heights relative to the ceiling 12 to provide alternative functions.

In the preferred embodiment, the storage unit 10 is a standard rectangular shelf structure, having open or closed sides, back, top and bottom. For example, the unit may be a SUPER ERECTA or METRO MAX multi-shelf structure available from InterMetro Industries Corporation, the assignee of the subject invention. Generally, the shelf unit may be made of any sturdy lightweight material, but is preferably composed of strong lightweight material such as steel, stainless steel, aluminum, or plastics. It will be appreciated that a shelf structure of such composition is particularly suited for use in a fast food restaurant because it is easy to clean and maintain sterile for food storage. In any event, the present invention is not limited to the particular structure or composition of the storage unit itself.

In the preferred embodiment, the U-shaped frame 14 also is composed of a sturdy material, such as steel or aluminum. Other materials, such as plastics, may be used in alternative applications. As shown in FIG. 2, in one embodiment the frame 14 is rigidly fixed to roof struts 20 by an assembly of cross-bars 22 and struts 24. However, it will be appreciated that the means for supporting the frame 14 between the roof 14 and ceiling 12 structure will depend on the particular type of roof and ceiling structure encountered. Those skilled in the art readily will understand that alternative structures and methods for rigidly fixing the frame 14 above the ceiling 12, such as mounting the frame on the ceiling or the roof structure, are possible. Furthermore, it is possible to mount the frame on supports carried on the floor to space the frame above the floor.

Vertical guides 26R and 26L are mounted on each side of the frame 14 for guiding the storage unit 10 in a vertical direction between the retracted storage position and the lowered or access position. FIG. 1 shows in solid lines the storage unit 10 in the access position and in phantom lines the storage unit in the retracted position. FIG. 2 shows in solid lines the storage unit in the retracted storage position, while the access position of the unit is shown by phantom lines.

Vertical guide followers 28R and 28L are provided on opposite sides of the storage unit 10 and each cooperate in telescope-like fashion with one vertical guide 26R and 26L, respectively. Guides that have the form of heavy-duty drawer guides may be used as the vertical guides and guide followers. The vertical guides and guide followers rigidly hold the storage unit in both the retracted and access positions and during movement therebetween in stable fashion to prevent it from tipping. In this way the shelves comprising the unit are maintained in a horizontal attitude so that even open containers of liquid can be safely stored on them. Moreover, the chances of any stored item toppling from a shelf are greatly reduced.

Referring now particularly to FIG. 3, the preferred embodiment of the vertical lift mechanism 18 includes a multiple pulley and endless, continuous cable system arranged in an inverted U-shape that conforms to and is congruent with the frame 14. Specifically, the system includes a drive sprocket 30 and a follower sprocket 32 each having a horizontally extending shaft, and two idler pulleys 34 and 36 mounted on shafts that are respectively coaxial with the shafts of the sprockets 30 and 32. The sprockets 30 and 32, and pulleys 34 and 36 are mounted at the top of the frame 14. Two additional idler pulleys 38 and 40 are mounted on horizontally extending shafts at the base of the frame 14. The shafts of the pulleys 38 and 40 are perpendicular to the shafts of the sprockets 30 and 32 and pulleys 34 and 36 and as shown are mounted on opposite legs of the frame 14. Each of the follower sprocket 32, idler pulleys 34 and 36 and idler pulleys 38 and 40 are free spinning on their respective shafts. It will be further appreciated that in this arrangement, the drive sprocket 30, follower sprocket 32, idler pulleys 34 and 36 and idler pulleys 38 and 40, may be mounted and arranged compactly within the body of the frame 14.

A continuous cable 42, including a positive drive chain portion 48 and a cable portion 49, is reeved about the sprockets and pulleys of the lift mechanism as shown. In addition, a tensioning sprocket or pulley (not shown) may be provided to run against the continuous cable 42 and maintain suitable tension in it.

Lifting pins 44 and 46 are secured to diagonally opposing vertically extending legs of the continuous cable 42. That is, one lifting pin 44 is secured to the rearmost vertically extending leg of the continuous cable 42 at one side of the inverted U-shaped configuration, while the other lifting pin 46 is mounted on the forwardmost vertically extending leg of the continuous cable 42 at the other side of the inverted U-shaped configuration.

In the preferred embodiment, the vertical lifting mechanism 18 is driven by a motor 50. As shown by phantom lines in FIG. 2, the motor 50 preferably is mounted at the top of the frame 14, and is activated remotely by an operator through a suitable remote switch (not shown). The motor 50 drives a driving sprocket 52, which in turn powers a driven sprocket 54 through a continuous drive chain (or belt) 56 (see FIG. 3). The driven sprocket 54 is coupled to the shaft of the drive sprocket 30 and provides direct power thereto. It will be appreciated that the motor 50, driving sprocket 52 and driven sprocket 54 are arranged to drive the drive sprocket 30 alternatively and selectably in the clockwise and counter-clockwise direction, as shown by arrow 58.

Of course, the reduction drive comprising the driving sprocket 52, driven sprocket 54 and drive belt 56 may be eliminated, and the drive sprocket 30 may be powered directly through the shaft of the motor or through other suitable coupling arrangements.

The positive drive chain portion 48 of the continuous cable 42 provides a direct drive from the drive sprocket 30 to the continuous cable 42. The length of the drive chain portion 48 is selected in accordance with the maximum vertical height through which the storage unit 10 is to be moved. Most preferably, the drive chain portion 48 is selected to extend from the idler pulley 38 over the drive sprocket 30 and about the follower sprocket 32. This arrangement provides a reliable, non-slip direct drive to the continuous cable 42.

As shown in FIG. 1, the lifting pins 44 and 46 are arranged to engage the respective vertical guide followers 28R and 28L mounted on the opposite sides of the storage unit 10. Therefore, when the motor 50 is activated, the endless cable 42 is driven in a continuous loop such that the lifting pins 44 and 46 simultaneously move in a vertical direction, and remain in a common horizontal plane during such movement. This arrangement of the vertical guides 26R and 26L, the vertical guide followers 28R and 28L, and the pulley and continuous cable system provides both vertical and horizontal stability while the storage unit 10 is moving between the retracted storage position and the access position.

The arrangement of the components of the lifting mechanism causes the lifting pins 44 and 46 to move in unison in the vertical direction. Therefore, it is not necessary that they be in a common horizontal plane so long as they are linked to the vertical guide followers when shelves of the storage unit are in a horizontal attitude. Thus, the simultaneous movement of the pins will still cause the shelves of the storage unit to be maintained in the horizontal attitude during movement between the retracted and access positions.

As shown in FIGS. 1 and 2, the vertically retractable storage unit of the system of the present invention can be arranged at different heights relative to the ceiling 12. In one embodiment, as shown in bold lines, the system can be arranged so that when in the retracted storage position the bottom portion of the storage unit 10 is flush with the ceiling. In this manner, the bottom portion of the unit 10 may be designed to correspond to the ceiling so that the storage unit 10 is hidden when in the retracted position. Alternatively, as shown in phantom lines, the system can be arranged so that when in the retracted storage position, a dispenser portion 10D of the storage unit 10 remains exposed below the ceiling 12. In this manner, an operator may lower the storage unit 10 to stock the dispenser portion 10D, then retract the storage unit 10 to the retracted storage position and access the stocked product in dispenser portion 10D of the storage unit 10 without again extending the storage unit 10 to the access position.

It will be understood that the above described preferred embodiment achieves the desired objects and advantages of the present invention. The preferred embodiment provides a storage system having a rigidly, stably supported vertically retractable storage unit that may be moved to a position above a false or suspended ceiling. Moreover, the preferred embodiment accomplishes these objects and advantages with a simple, reliable, and compact mechanism and support structure.

Numerous other embodiments and modifications will be apparent to those skilled in the art. Therefore, it will be understood that the above description of a preferred embodiment is illustrative only. It is not intended to limit the scope of the present invention, which is defined by the following claims.

What is claimed is:

1. A storage system for selectably providing access to the space between a suspended ceiling and a support structure thereabove and for storing articles therein, said system comprising:
   a frame disposed substantially above said suspended ceiling and secured in position between said suspended ceiling and said support structure;
   a storage unit; and
   a vertical lifting mechanism disposed substantially above said ceiling and cooperating with said frame rigidly and stably to support said storage unit and to translate said storage unit between a retracted storage position and a lowered access position; said vertical lifting mechanism comprising vertical guide means, vertical guide follower means, lifting means, a plurality of pulleys and a continuous cable reeved about said plurality of pulleys; and vertical guide means being fixed to said frame, said vertical guide follower means being fixed to an upper portion of said storage unit; said lifting means including a pair of lifting pins, and said pulleys guiding said reeved continuous cable in an inverted generally U-shape configuration above said storage unit; said lifting pins being coupled to said storage unit and affixed to said continuous cable on opposite legs of said inverted U-shape, such that reciprocal traveling of said continuous cable about said pulleys causes said lifting means simultaneously and reciprocally to translate in the vertical direction and to translate said storage unit in the vertical direction while maintaining said storage unit in a stable attitude relative to a horizontal plane.

2. The storage system recited in claim 1, wherein said frame and said vertical lifting mechanism are disposed above the ceiling.

3. The storage system recited in claim 2, wherein a bottom portion of the storage unit conforms with the ceiling to hide said storage unit when in the retracted storage position.

4. The storage system recited in claim 1, wherein said frame has an inverted U-shape and said pulleys and said continuous cable are mounted within said frame.

5. The storage system recited in claim 1, wherein the U-shape configuration of said guiding pulleys and reeved continuous cable substantially is contained in three planes, the opposite legs of said inverted U-shape configuration being contained in respective planes that are substantially parallel.

6. A storage system for selectably moving a storage unit between a raised retracted position and a lowered access position relative to a floor, said system comprising:

a frame;

means for mounting said frame in spaced relation above the floor;

a storage unit; and a vertical lifting mechanism disposed above said floor and cooperating with said frame rigidly and stably to support said storage unit and to translate said storage unit between the retracted storage position and the lowered access position, said vertical lifting mechanism comprising vertical guide means, vertical guide follower means, lifting means, a plurality of pulleys and a continuous cable reeved about said plurality of pulleys; said vertical guide means being fixed to said frame, said vertical guide follower means being fixed to an upper portion of said storage unit, said lifting means including a pair of lifting pins, and said pulleys guiding said reeved continuous cable in an inverted generally U-shape configuration above sad storage unit; said lifting pins being coupled to said storage unit and affixed to said continuous cable on opposite legs of said inverted U-shape, such that reciprocal traveling of said continuous cable about said pulleys causes said lifting means simultaneously and reciprocally to translate in the vertical direction and to translate said storage unit in the vertical direction while maintaining said storage unit in a stable attitude relative to a horizontal plane.

7. The storage system recited in claim 6, wherein a suspended ceiling is disposed above said floor and wherein said frame and said vertical lifting mechanism are disposed above the ceiling.

8. The storage system recited in claim 7, wherein a bottom portion of the storage unit conforms with the ceiling to hide said storage unit when in the retracted storage position.

9. The storage system recited in claim 6, wherein the U-shape configuration of said guiding pulleys and reeved continuous cable substantially is contained in three planes, the opposite legs of said inverted U-shape configuration being contained in respective planes that are substantially parallel.

10. The storage system recited in claim 6, wherein said frame has an inverted U-shape and said pulleys and said continuous cable are mounted within said frame.

* * * * *

UNITED STATES PATENT AND TRADEMARK OFFICE
CERTIFICATE OF CORRECTION

PATENT NO. : 5,203,619
DATED : April 20, 1993
INVENTOR(S) : John H. Welsch, et al It is certified that error appears in the above-indentified patent and that said Letters Patent is hereby corrected as shown below:

COLUMN 6

Line 35, "and" should read --said--.

COLUMN 7

Line 11, "position," should read --position;--.
    Line 21, "sad" should read --said--.

Signed and Sealed this

Eighth Day of February, 1994

Attest:

BRUCE LEHMAN

*Attesting Officer*  *Commissioner of Patents and Trademarks*